E. BUNZEL.
FLOWER POT HOLDER AND CARRIER.
APPLICATION FILED DEC. 23, 1916.
1,266,102.
Patented May 14, 1918.
2 SHEETS—SHEET 1.
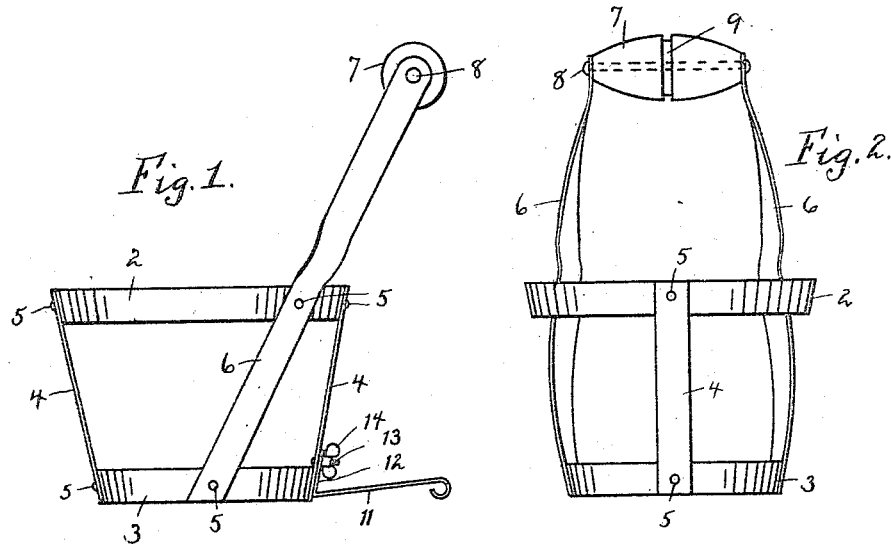
Fig. 1.
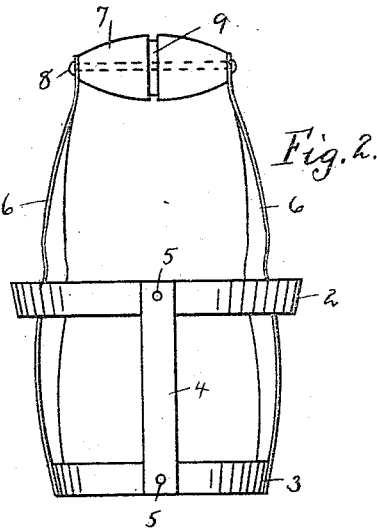
Fig. 2.
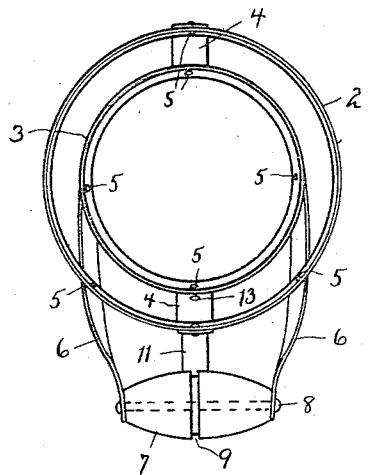
Fig. 3.
Fig. 4.
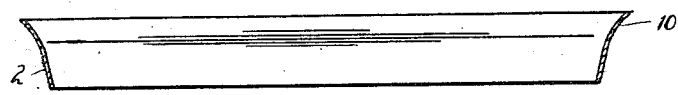
Witnesses
H. W. Burton
M. P. Williamson
By
Inventor
Earnest Bunzel
W. W. Williamson
Attorneys E. BUNZEL.
FLOWER POT HOLDER AND CARRIER.
APPLICATION FILED DEC. 23, 1916.
1,266,102.
Patented May 14, 1918.
2 SHEETS—SHEET 2.
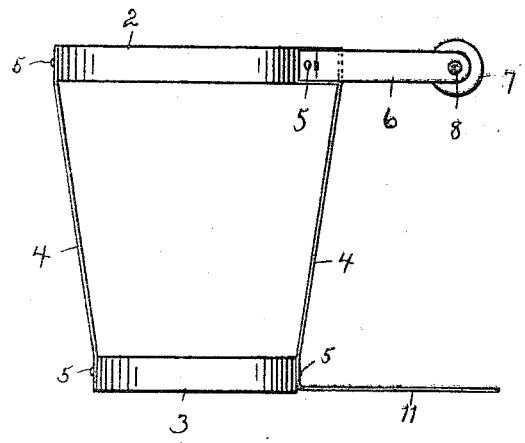
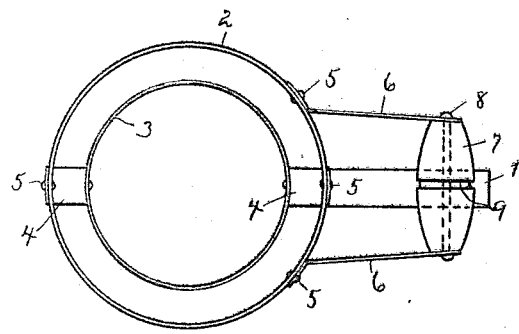
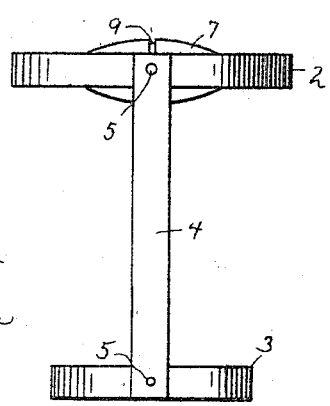
WITNESSES
INVENTOR
Earnest Bunzel

UNITED STATES PATENT OFFICE.

EARNEST BUNZEL, OF CONSHOHOCKEN, PENNSYLVANIA.

FLOWER-POT HOLDER AND CARRIER.

1,266,102.　　　　　Specification of Letters Patent.　　Patented May 14, 1918.

Application filed December 23, 1916. Serial No. 138,614.

*To all whom it may concern:*

Be it known that I, EARNEST BUNZEL, a citizen of the United States, residing at Conshohocken, in the county of Montgomery and State of Pennsylvania, have invented new and useful Improvements in Flower-Pot Holders and Carriers, of which the following is a specification.

My invention relates to new and useful improvements in flower pot holders and carriers, and has for its object to provide an exceedingly simple and effective device of this character which may be used as a hanging basket flower pot stand or holder, or as a carrier to transport potted plants from one place to another without injury to the plant and without inconvenience to the user.

A still further object of the invention is to provide a device which will be relatively inexpensive in the cost of manufacture, although exceedingly strong and durable and one which will accommodate various sizes of pots, tubs or other receptacles in which plants are planted or in which flowers are placed for exhibiting purposes.

With these ends in a view, this invention consists in the details of construction and combination of elements hereinafter set forth and then specifically designated by the claims.

In order that those skilled in the art to which this invention appertains, may understand how to make and use the same, I will describe its construction in detail, referring by numeral to the accompanying drawing forming a part of this application, in which—

Figure 1, is a side elevation of my improved flower pot holder and carrier.

Fig. 2, is a front elevation thereof.

Fig. 3, is a plan view thereof.

Fig. 4, is an enlarged sectional view of one of the rings or hoops showing the flared upper edge.

Fig. 5, is a side elevation of a slightly modified form of my invention.

Fig. 6, is a plan view thereof; and

Fig. 7, is a front elevation thereof.

In carrying out my invention as embodied in Figs. 1 to 4 inclusive, 2 and 3 represent two hoops, the latter being smaller than the former and arranged concentrically and spaced apart by the bars or strips 4, the ends of which are secured to the hoops 2 and 3 by rivets 5 or their equivalent. 6 represents a pair of handle side rails, which are secured at their lower ends to the lower or smaller hoop 3 at opposite sides, said handle side rails projecting upwardly and backwardly at an angle as plainly shown in Fig. 1, and their upper ends are gradually brought toward each other as shown in Fig. 2, and between these ends is secured a handle 7 by means of a rod 8, the ends of which are headed against the handle side rails 6.

The handle 7 preferably tapers from the center toward its ends, in order to produce a convenient handhold, and midway between its ends is formed an annular groove 9 adapted to engage a hook or other suitable support when the device is being used as a hanging basket.

The upper hoop 2 has its upper edge flared outwardly as indicated by 10 in Fig. 4, which produces a mouth of greater width than the rest of the hoop and permits a pot to be readily inserted and if found desirable the lower hoop 3 may also be flared in the same manner, thus permitting the pot or other receptacle to readily enter said hoop.

The device constructed along the lines just described may be used as a stand for holding a flower pot, tub or other similar receptacle, and when it is desired to transport the same from place to place, it is only necessary to take hold of the handle 7 at, which time the potted plant setting in the holder and carrier will cause the body of the device formed by the hoops and side rails to lie at an angle, while the handle side rails assume a perpendicular position, thus moving the plant away from the person carrying the same, preventing said plant from coming in contact with the clothes of said person, or the one carrying the plant.

When the device is to be used as a hanging basket, I provide an extending support 11 of any suitable size, shape or configuration, and this is provided with an angular foot 12 adapted to engage one of the connecting strips 4 having a screw 13 passing through said connecting strip, and the foot 12 of the extending support, said screw having a nut 14 threaded thereon.

With the addition of the extending support the device may be used as a hanging basket by placing the handle over the hook or other supporting device, while the extending support 11 will engage the exterior face of the object to which the hook or other support is fastened, thereby holding the device in an upright position as shown in Fig.

1, at which time the growing plant may extend out in all directions or may droop or hang down from the pot in which it is planted without coming in contact with any other object.

In Figs. 5 to 7 inclusive I have shown a slightly different construction of my invention, in which one of the bars or strips 4 is formed from a longer piece of material than the other, and the lower end of this material is bent outward to form an integral extending support 11 and the handle side rails 6 are secured only to the upper hoop and extend rearwardly in the same plane as said hoop.

By constructing the holder and carrier in this manner the same may be manufactured at a more reasonable price, but will accomplish the same result as in the preferred form.

Of course I do not wish to be limited to the exact details of construction as here shown, as these may be varied within the limits of the appended claims without departing from the spirit of my invention.

Having thus fully described my invention, what I claim as new and useful, is—

1. A flower pot holder and carrier comprising two concentric hoops of different size, connecting strips secured to said hoops for spacing them apart, a pair of oppositely disposed handle side rails secured to said hoops and projecting upwardly therefrom at an angle to the vertical center of the hoops, whereby said side rails extend beyond the outer circumference of the larger hoop and a handle mounted between the upper ends of the handle side rails as shown.

2. A flower pot holder and carrier comprising two concentric hoops of different size, connecting strips fixed to said hoops for spacing them apart, a pair of oppositely disposed handle side rails secured to each of said hoops and projecting upwardly therefrom at an angle to the vertical center of the hoops, a handle fixed between the upper, outer ends of the handle side rails and an extending support carried by one of the connecting strips adjacent the lower hoop for the purpose specified.

In testimony whereof, I have hereunto affixed my signature in the presence of two subscribing witnesses.

EARNEST BUNZEL.

Witnesses:
 WR. ALVIN BUNZEL,
 MARY M. CALLA.